United States Patent [19]
Cohen et al.

[11] Patent Number: 6,093,863
[45] Date of Patent: Jul. 25, 2000

[54] METHOD FOR INHIBITING THE FORMATION OF GAS HYDRATES

[75] Inventors: Jeffrey M. Cohen, Fairlawn; William D. Young, Cedar Grove, both of N.J.

[73] Assignee: ISP Investments Inc., Wilmington, Del.

[21] Appl. No.: 09/452,557

[22] Filed: Dec. 1, 1999

Related U.S. Application Data

[60] Division of application No. 09/168,981, Oct. 7, 1998, which is a continuation-in-part of application No. 08/910,128, Aug. 13, 1997, abandoned.

[51] Int. Cl.⁷ ............... C07C 9/00; C07C 7/20; B01D 47/00
[52] U.S. Cl. ............... 585/15; 95/153; 137/3; 137/13; 585/950
[58] Field of Search ............... 585/15, 950; 95/153; 137/3, 13

[56] References Cited

U.S. PATENT DOCUMENTS

| | | | |
|---|---|---|---|
| 5,639,925 | 6/1997 | Sloan, Jr. et al. | 585/15 |
| 5,723,524 | 3/1998 | Cohen et al. | 524/376 |
| 5,874,660 | 2/1999 | Colle et al. | 585/15 |

*Primary Examiner*—Ana Woodward
*Attorney, Agent, or Firm*—Walter Katz; William J. Davis; Marilyn J. Maue

[57] ABSTRACT

A composition for preventing or retarding the formation of gas hydrates or for reducing the tendency of gas hydrates to agglomerate, during the transport of a fluid comprising water and a hydrocarbon, through a conduit, comprising, (a) a polymer or copolymer selected from a terpolymer of vinyl pyrrolidone, vinyl caprolactam and an ammonium derivative monomer having from 6 to 12 carbon atoms, selected from the group consisting of dialkyl aminoalkyl methacrylamide, dialkyl dialkenyl ammonium halide and a dialkylamino alkyl acrylate or methacrylate, a copolymer of vinyl pyrrolidone and vinyl caprolactam, and a homopolymer of vinyl caprolactam, and (b) an alcohol containing three to five carbon atoms and one hydroxy group.

4 Claims, No Drawings

METHOD FOR INHIBITING THE FORMATION OF GAS HYDRATES

This is a division of application Ser. No. 09/168,981, filed on Oct. 7, 1998 which is a continuation-in-part of Ser. No. 08/910,128, filed on Aug. 13, 1997 (now abandoned).

This application is a continuation-in-part application of Ser. No. 08/910,128, filed Aug. 13, 1997 abandoned.

BACKGROUND OF THE INVENTION

1. Field of the Invention

The invention relates to a method for preventing or retarding the formation of gas hydrates or for reducing the tendency of such hydrates to agglomerate during the transport of a fluid comprising water and a hydrocarbon through a conduit, and, more particularly, to the addition of a mixture of a polyvinyl pyrrolidone or caprolactam polymer and an alcohol to the fluid to inhibit such gas hydrate formation.

2. Description of the Prior Art

It is well known in the art that the formation of gas hydrates in a conduit, e.g. a pipeline, during the transport of liquids, such as oil, and gases, particularly lower hydrocarbons, e.g. methane, ethane, propane, butane, isobutane and natural gas is a serious problem, especially in areas with a low temperature in the winter season or in the sea. Generally the temperatures are so low that gas hydrate formation, due to the inevitable presence of co-produced water in the wells takes place, if no special steps are taken. Insulation decreases the chance of gas hydrate formation; however, if the field is relatively small and far away from the production platform, the costs of using insulation are too high to make such field economically attractive. It is also known to add anti-freeze compounds, for example, glycol or methanol, during transport to minimize gas hydrate formation; however, large quantities of these compounds are required to be effective which is expensive. Alkyl glycosides also have been used for this purpose.

A representation of the prior art in this field are the following patents: U.S. Pat. Nos. 5,420,370; 5,432,292; 4,915,176; EPA 0526929A1; EPO 0323774A1; Can. Pat. Appln 2,073,577; WO 93/25692; WO 95/17579; Gas Hydrates and Hydrate Prevention 73 GPA Annual Convention, pgs 85–93; WO 96/08456; WO 96/08636; WO 93/25798; EPA 0457375A1; WO 9412761.

CROSS REFERENCE TO RELATED APPLICATIONS

This application is related to patent application Ser. No. 08/743,696, filed Nov. 6, 1996, U.S. Pat. No. 5,723,524 by the same inventors herein, entitled "A Method for Preventing or Retarding the Formation of Gas Hydrates".

SUMMARY OF THE INVENTION

What is described herein is a composition for effectively preventing or retarding the formation of gas hydrates, or for reducing the tendency of gas hydrates to agglomerate, during the transport of a fluid comprising water and a hydrocarbon, through a conduit, comprising, by weight, (a) a polymer or copolymer of vinyl pyrrolidone (VP) and/or vinyl caprolactam (VCL), preferably a terpolymer of 17–32% of vinyl pyrrolidone, 65–80% of vinyl caprolactam and 3–6% of an ammonium derivative monomer having from 6 to 12 carbon atoms, selected from the group consisting of dialkyl aminoalkyl methacrylamide, dialkyl dialkenyl ammonium halide and a dialkylamino alkyl acrylate or methacrylate, or a vinyl caprolactam homopolymer, and (b) the rest of the composition being an alcohol containing one hydroxy group and three to five carbon atoms, preferably propyl alcohol, sec-butyl alcohol, n-butyl alcohol, tert-butyl alcohol, isopropyl alcohol and 1-pentanol.

In one embodiment of the invention, the polymer component of the inhibitor composition is a terpolymer of vinyl pyrrolidone, vinyl caprolactam and a dialkylaminoalkyl acrylate or methacrylate.

DETAILED DESCRIPTION OF THE INVENTION

Suitable terpolymers for use in the composition of the invention are described in detail by Lorenz et al. in U.S. Pat. No. 4,521,404. A preferred terpolymer is Gaffix® VC-713, which is sold by International Specialty Products, Wayne, New Jersey. Gaffix® VC-713 is a terpolymer of 17–32% vinyl pyrrolidone, 65–80% vinyl caprolactam and 3–6% dimethylaminoethyl methacrylate, by weight.

Another preferred polymer which exhibits inhibitory characteristics in the composition of the invention is a homopolymer of vinyl caprolactam (VCL).

Generally, the polymer is used in an amount of about 20 to 50% by weight based on the total composition, i.e. in admixture with the alcohol solvent. The polymer inhibition concentration in the pipeline, i.e. the aqueous phase, is about 0.1 to 3% by weight of the aqueous phase; the solvent inhibition concentration accordingly, is about 0.1 to 5% by weight in the aqueous phase.

Alcohols which are effective in providing the advantageous gas hydrate inhibition contain one hydroxy group and three to five carbon atoms. Representative alcohols are 1-pentanol; 1-butanol, also known as n-butyl alcohol; 2-methyl-2-propanol, also known as tert-butyl alcohol; 2-butanol, also known as sec-butyl alcohol; 2-propanol, also known as isopropyl alcohol; and 1-propanol, also known as propyl alcohol.

The following examples are provided to illustrate the invention.

GENERAL METHOD

The gas hydrate inhibition tests were conducted in a 300 ml stainless steel stirred autoclave at high pressure and low temperature. In a typical experiment, 0.5 to 1.5 wt % of the inhibitor composition was added to 120 g of a 3.5 wt % sea salt solution. The resulting mixture was transferred to the 300 ml autoclave and immersed in a constant temperature bath at 4° C. The pressure was then increased to 1000 psig with green canyon gas and held constant to within about 5 psi throughout the experiment with a programmable syringe pump. After the pressure reached 1000 psig, the autoclave stirrer was turned on to 1000 rpm. The gas volume, as measured by the syringe pump, the gas pressure, and the fluid temperature were measured and electronically recorded at 1 minute intervals throughout the experiment. Gas consumption in the cell indicates hydrate formation.

The results are shown below in Table 1. An extended inhibition time e.g. 200 minutes or greater, preferably 400 to 1000, is indicative of a composition which provides the desired gas hydrate inhibition. Standard and comparative results are shown in Table 2.

TABLE 1

| Composition | | |
|---|---|---|
| Polymer* | Solvent** | Inhibition Time (min) |
| Gaffix ® VC-713 | 1-pentanol | 300 |
| Gaffix ® VC-713 | n-butyl alcohol | 400 |
| Gaffix ® VC-713 | sec-butyl alcohol | 700 |
| Gaffix ® VC-713 | tert-butyl alcohol | 400 |
| Gaffix ® VC-713 | propyl alcohol | 600 |
| Gaffix ® VC-713 | isopropyl alcohol | 250 |
| PVCL | sec-butyl alcohol | 540 |
| VP/VCL (50:50) | sec-butyl alcohol | 450 |

*0.5 wt %
**0.75 wt %

TABLE 2

| None | None | 0 |
|---|---|---|
| None | n-butyl alcohol | 0 |
| Gaffix ® VC-713 | None | 2 |
| Gaffix ® VC-713 | Methanol | 5 |
| Gaffix ® VC-713 | Ethanol | 20 |
| VCL | Methanol | 0 |
| VCL/VP | Methanol | 0 |

While the invention has been described with particular reference to certain embodiments thereof, it will be understood that changes and modifications may be made which are within the skill of the art. Accordingly, it is intended to be bound only by the following claims, in which:

What is claimed is:

1. A method of preventing or retarding the formation of gas hydrates or for reducing the tendency of gas hydrates to agglomerate, during the transport of a fluid comprising water and a hydrocarbon through a conduit which comprises adding the composition consisting essentially of, by weight (a) 20–50% based on the total composition of a polymer or copolymer selected from the group consisting of (1) a terpolymer of 17–32% by weight vinyl pyrrolidone, 65–80% by weight vinyl caprolactam and 3–6% by weight of an ammonium derivative monomer having from 6 to 12 carbon atoms selected from the group consisting of a dialkyl aminoalkyl methacrylamide, a dialkyl dialkenyl ammonium halide and a dialkylamino alkyl acrylate or methacrylate, (2) a copolymer of vinyl pyrrolidone and vinyl caprolactam, and (3) a homopolymer of vinyl caprolactam, and (b) the rest of the composition being an alcohol containing one hydroxy group and having 3 to 5 carbon atoms selected from the group consisting of propyl alcohol, sec-butyl alcohol, n-butyl alcohol, tert-butyl alcohol, isopropyl alcohol and 1-pentanol in an amount of 0.1 to 3% by weight of the water in said fluid.

2. The method according to claim 1 wherein said terpolymer includes an ammonium derivative monomer which is dimethylaminoethyl methacrylate.

3. The method according to claim 1 wherein said polymer is a homopolymer of vinyl caprolactam.

4. The method according to claim 1 wherein said copolymer comprises vinyl pyrrolidone and vinyl caprolactam.

* * * * *